United States Patent
Tai

(10) Patent No.: US 8,380,886 B2
(45) Date of Patent: Feb. 19, 2013

(54) COMPUTER SYSTEM

(75) Inventor: Wen-Chih Tai, Hsinchu County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 0 days.

(21) Appl. No.: 12/982,845

(22) Filed: Dec. 30, 2010

(65) Prior Publication Data

US 2012/0110215 A1      May 3, 2012

(30) Foreign Application Priority Data

Oct. 27, 2010   (TW) ................................ 99136809 A

(51) Int. Cl.
*G06F 3/00* (2006.01)
*G06F 3/038* (2006.01)

(52) U.S. Cl. ............................... 710/14; 710/8; 345/204

(58) Field of Classification Search .................... None
See application file for complete search history.

(56) References Cited

U.S. PATENT DOCUMENTS

| | | | | |
|---|---|---|---|---|
| 4,956,708 A | * | 9/1990 | Itagaki | 348/441 |
| 6,297,850 B1 | * | 10/2001 | Han et al. | 348/521 |
| 7,315,989 B2 | * | 1/2008 | Medvedev et al. | 715/867 |
| 2001/0028346 A1 | * | 10/2001 | Kudo et al. | 345/204 |
| 2009/0243995 A1 | * | 10/2009 | Kimura | 345/102 |
| 2009/0244102 A1 | * | 10/2009 | Nakagawa et al. | 345/690 |
| 2009/0322725 A1 | * | 12/2009 | David et al. | 345/211 |
| 2009/0322969 A1 | * | 12/2009 | Unger | 348/790 |

FOREIGN PATENT DOCUMENTS

TW    200937383    9/2009
TW    201009781    3/2010

* cited by examiner

*Primary Examiner* — Henry Tsai
*Assistant Examiner* — Michael Sun
(74) *Attorney, Agent, or Firm* — Jianq Chyun IP Office

(57) ABSTRACT

A computer system including a data processing device for producing an image signal, an input device for producing a control signal and a display device is provided. The display device includes a memory unit, a controller, a source driver, a gate driver and a display panel. The controller is coupled to the memory unit and the data processing device for receiving the image signal. The source driver and the gate driver are controlled by the controller to respectively output driving voltages and scanning signal to drive the display panel. In a reading model, the controller writes a plurality of frame data transmitted by the image signal to the memory unit, and reads one of the frame data according to the control signal to control the source driver and the gate driver. The data processing device is switched to an idle mode after the frame data is transmitted.

9 Claims, 3 Drawing Sheets

COMPUTER SYSTEM

CROSS-REFERENCE TO RELATED APPLICATION

This application claims the priority benefit of Taiwan application serial no. 99136809, filed on Oct. 27, 2010. The entirety of the above-mentioned patent application is hereby incorporated by reference herein and made a part of this specification.

BACKGROUND

1. Field of the Invention

The invention relates to a computer system. Particularly, the invention relates to a computer system having a display device.

2. Description of Related Art

In recent years, with booming development of semiconductor technology, portable electronic products and flat panel display products are accordingly developed. In various flat panel displays, a liquid crystal display (LCD) has become a main stream of the display products due to its advantages of low voltage operation, no irradiation, light weight and small size, etc.

Taking an application of applying the LCD in a personal computer or a notebook computer as an example, the personal computer or the notebook computer continuously outputs frame data to the LCD, and the LCD displays images according to the frame data. However, when a user reads static data, the LCD generally displays a same frame for a period of time, and a changing rate of the frame is relatively slow, which is similar to a situation that the user reads a book. However, to ensure a normal display of the LCD, even if a part of the frame data is the same, the personal computer or the notebook computer has to continuously output the frame data to the LCD, so that power consumption of the personal computer or the notebook computer maintained in an operation state cannot be reduced.

SUMMARY OF THE INVENTION

The invention is directed to a computer system, which can reduce power consumption when a user reads static data.

The invention provides a computer system including a data processing device, an input device and a display device. The data processing device produces an image signal. The input device produces a control signal. The display device includes a memory unit, a controller, a source driver, a gate driver and a display panel. The controller is coupled to the memory unit and the data processing device for receiving the image signal. The source driver is coupled to the controller, and is controlled by the controller to output a plurality of driving voltages. The gate driver is coupled to the controller and is controlled by the controller to output a plurality of scan signals. The display panel is coupled to the gate driver and the source driver for displaying according to the driving voltages and the scan signals. In a reading mode, the controller is coupled to the input device, and writes a plurality of frame data transmitted by the image signal to the memory unit, and reads one of the frame data according to the control signal to control the source driver and the gate driver. The data processing device is switched to an idle mode after the frame data is transmitted.

In an embodiment of the invention, in a general mode, the controller sequentially stores the frame data in the memory unit, and controls the gate driver and the source driver according to the frame data stored in the memory unit.

In an embodiment of the invention, the controller includes a data writing unit and a data reading unit. The data writing unit is coupled to the memory unit and the data processing device for receiving the image signal. In the general mode, the data writing unit sequentially writes the frame data in a position of the memory unit. In the reading mode, the data writing unit sequentially writes the frame data in different positions of the memory unit. The data reading unit is coupled to the memory unit. In the general mode, the data reading unit reads the frame data stored in the position of the memory unit. In the reading mode, the data reading unit reads the frame data stored in the memory unit according to the control signal.

In an embodiment of the invention, the data reading unit includes a counter. The counter is controlled by the control signal, and the data reading unit determines the frame data to be read according to a counting result of the counter.

In an embodiment of the invention, the controller further includes a compressing unit and a decompressing unit. The compressing unit is coupled between the data writing unit and the data processing device for compressing the frame data. The decompressing unit is coupled to the data reading unit for restoring the compressed frame data.

In an embodiment of the invention, when the frame data stored in the memory unit are all read, the display device is switched to the general mode, and wakes up the data processing device to restore the data processing device to an operation mode to produce the frame data transmitted by the image signal.

In an embodiment of the invention, when an amount of unread data of the frame data stored in the memory unit is equal to a value, the display device wakes up the data processing device to restore the data processing device to an operation mode to produce the frame data transmitted by the image signal, and the display device is switched to the general mode when all of the frame data stored in the memory unit is read.

In an embodiment of the invention, the display device is controlled by the data processing device and is switched to the reading mode.

In an embodiment of the invention, in the general mode, the input device is coupled to the data processing device.

In an embodiment of the invention, the data processing device switches the display device to the reading mode according to the control signal.

In an embodiment of the invention, the data processing device switches the display device to the reading mode when a read file is static data.

In an embodiment of the invention, the display panel is a liquid crystal display panel.

According to the above descriptions, in the computer system of the invention, when the display device is in the reading mode, it can store a plurality of frame data, so that frames can be displayed according to the stored frame data, and the user can switch the displayed frames through the input device. Now, the data processing device enters the idle mode, so as to reduce the power consumption of the computer system.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings

DETAILED DESCRIPTION OF DISCLOSED EMBODIMENTS

Figure 1:
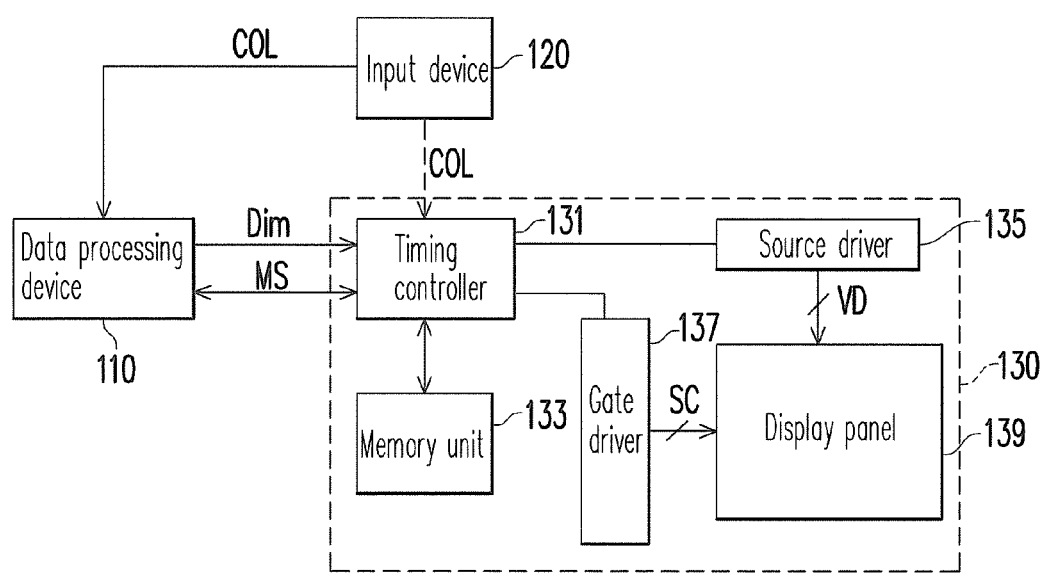
FIG. 1 is a system schematic diagram illustrating a computer system according to an embodiment of the invention.

FIG. 1 is a system schematic diagram illustrating a computer system according to an embodiment of the invention. Referring to FIG. 1, in the present embodiment, the computer system 100 includes a data processing device 110, an input device 120 and a display device 130. The computer system 100 can be a personal computer or notebook computer. The data processing device 110 can be a host of the personal computer or a main board of the notebook computer, which produces an image signal Dim after data processing, and outputs a mode signal (MS) to control the display device 130 is switched to a reading mode or a general mode. The input device 120 is, for example, a keyboard or a mouse, which is used for producing a control signal COL, where the control signal COL can be a high/low voltage level or an I²C signal. The display device 130 can be a screen of the personal computer or the notebook computer.

The display device 130 includes a timing controller 131, a memory unit 133, a source driver 135, a gate driver 137 and a display panel 139, where the display panel 139 can be a liquid crystal display panel. The timing controller 131 is coupled to the memory unit 133 and the data processing device 110 for receiving the image signal Dim and the mode signal MS, where the mode signal MS can be an I²C signal. The source driver 135 is coupled to the timing controller 131, and is controlled by the timing controller 131 to output a plurality of driving voltages VD. The gate driver 137 is coupled to the timing controller 131 and is controlled by the timing controller 131 to output a plurality of scan signals SC. The display panel 139 is coupled to the source driver 135 and the gate driver 137 for displaying according to the driving voltages VD and the scan signals SC.

Further, when a user reads static data (for example, a text file or a picture file), i.e. when the data processing device 110 reads the static data, the display device 130 can be switched to the reading mode according to the mode signal MS, and now the input device 120 is coupled to the timing controller 131 (for example, a coupling relation shown by a dash line between the timing controller 131 and the input device 120). Moreover, the timing controller 131 writes a plurality of frame data transmitted by the image signal Dim into the memory unit 133, and reads one of the frame data according to the control signal COL to control the source driver 135 and the gate driver 137. Moreover, the data processing device 110 is switched to an idle mode after the frame data is transmitted.

For example, when the data processing device 110 switches the display device 130 to the reading mode through the mode signal MS, the data processing device 110 produces a certain amount of the frame data (for example, 100 frames) to be displayed according to the static data read by the user, where the frame data is equivalent to each page of a book, and the amount of the frame data is determined by a size of the static data or a size of the memory unit 133 (mainly determined by the size of the memory unit 133), and each frame data is different. Now, since the frame data produced by the data processing device 110 is not necessarily to be immediately displayed, the frame data of each frame is stored (or written) in the memory unit 133.

After the data processing device 110 generates the frame data of 100 frames, it enters the idle mode. Moreover, the user controls the timing controller 131 to read the frame data to be displayed from the memory unit 133 through the control signal COL output by the input device 120. Since each frame may takes a few seconds to read, the same frame data is probably repeatedly read for dozens or hundreds of times. Therefore, since the data processing device 110 enters the idle mode, power consumption of the computer system 100 can be greatly reduced, and since the frame data to be displayed has already been stored in the memory unit 133, the display device 130 can normally display without being influenced.

On the other hand, the display device 130 is in the general mode before being switched to the reading mode, and the data processing device 110 is in an operation mode before entering the idle mode. When the display device 130 is in the general mode and the data processing device 110 is in the operation mode, the display device 130 continually generates the frame data for displaying, and the generated frame data is probably the same to a previous frame data. The timing controller 131 of the display device 130 sequentially stores the frame data into the memory unit 133 (i.e. the old frame data is replaced by the new frame data), and controls the source driver 135 and the gate driver 137 according to the frame data stored in the memory unit 131.

Moreover, when the display device 130 is in the general mode and the data processing device 110 is in the operation mode, the input device 120 is coupled to the data processing device 110 (for example, a coupling relation shown by a solid line between the data processing device 110 and the input device 120), and the data processing device 110 processes data according to the control signal COL output by the input device 120. Moreover, the data processing device 110 can determine whether or not to switch the display device 130 to the reading mode according to the control signal COL of the input device 120, or the data processing device 110 can switch the display device 130 to the reading mode when reading the static data, which is determined by those skilled in the art and is not limited by the invention.

Moreover, when the display device 130 is in the reading mode and the data processing device 110 is in the idle mode, the display device 130 reads the frame data stored in the memory unit 133 according to the control signal COL. When the frame data in the memory unit 133 is all read, the display device 130 is switched to the general mode, and wakes up the data processing device 110 to restore the data processing device 110 to the operation mode. Alternatively, when an amount of unread data of the frame data in the memory unit 130 is equal to a specific value (for example, 5), the display device 130 wakes up the data processing device 110, and the display device 130 is switched to the general mode when all of the frame data stored in the memory unit 133 is read. The mode signal MS can be used to notify the data processing device 110 whether the display device 130 is switched to the general mode.

According to the above descriptions, when the display device 130 is in the reading mode, the data processing device 110 in the operation mode may or may not generate the frame data. When the display device 130 receives the frame data, the frame data can be stored in the memory unit 133 without covering the unread frame data, and the received frame data can be stored at a specific position in the memory unit 133. However, the display device 130 does not perform display according to the latest received frame data, but still reads the frame data according to the control signal COL of the input device 120.

Moreover, in the present embodiment, the data processing device 110 and the timing controller 131 commonly use the input device 120, though in other embodiments, the data processing device 110 and the timing controller 131 can be respectively coupled to an input device 120, so as to perform control through different input devices 120.

Figure 2:
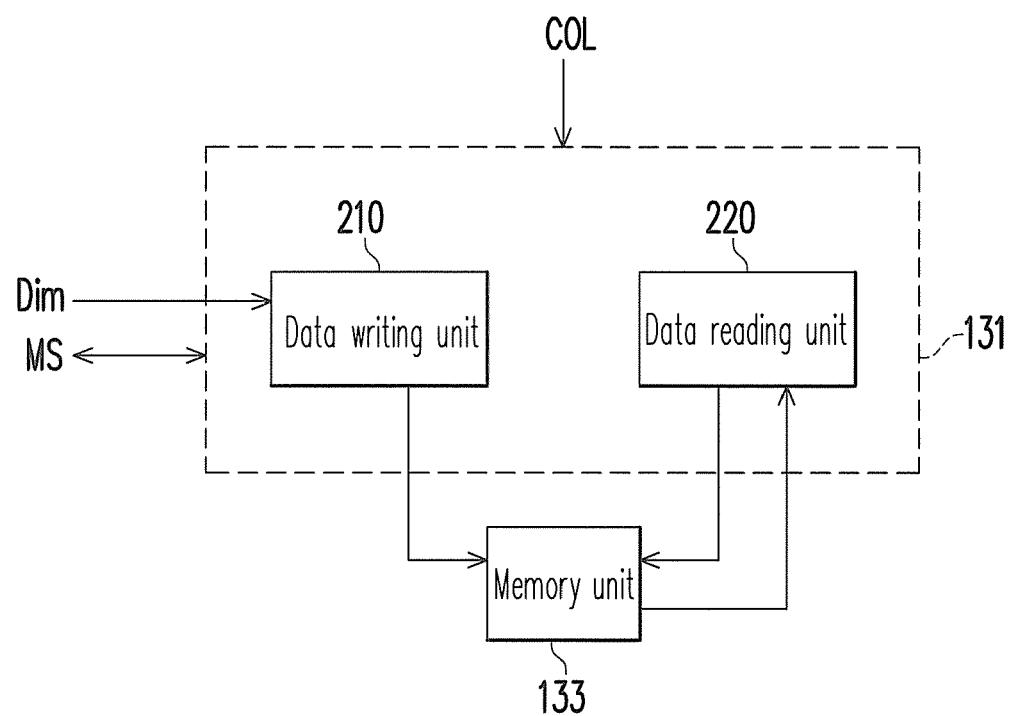
FIG. 2 is a system schematic diagram illustrating a timing controller of FIG. 1 according to an embodiment of the invention.

FIG. 2 is a system schematic diagram illustrating a timing controller according to an embodiment of the invention. Referring to FIG. 1 and FIG. 2, in the present embodiment, the timing controller 131 includes a data writing unit 210 and a data reading unit 220. The data writing unit 210 is coupled between the data processing device 110 and the memory unit 133 for receiving the image signal Dim. The data reading unit 220 is coupled to the memory unit 133. When the display device 130 is in the general mode, the data writing unit 210 sequentially writes the frame data into a specific position of the memory unit 133, and the data reading unit 220 read the frame data stored in the specific position of the memory unit 133. When the display device 130 is in the reading mode, the data writing unit 210 sequentially writes the frame data into different positions of the memory unit 133, and the data reading unit 220 reads the frame data stored in the memory unit 133 according to the control signal COL.

According to the above descriptions, the data reading unit 220 may include a counter, and the data reading unit 220 determines the frame data to be read according to a counting result of the counter, where the counting result of the counter is controlled by the control signal COL. For example, when the control signal COL represents displaying a next frame, the counting result is added by 1, and now the data reading unit 220 reads the next frame data. When the control signal COL represents displaying a previous frame, the counting result is decreased by 1, and now the data reading unit 220 reads the previous frame data. When the control signal COL represents skipping forward three frames, i.e. displaying a fourth frame, the counting result is added by 4, an now the data reading unit 220 reads the fourth frame data. The others are deduced by analogy, and the invention is not limited thereto.

Figure 3:
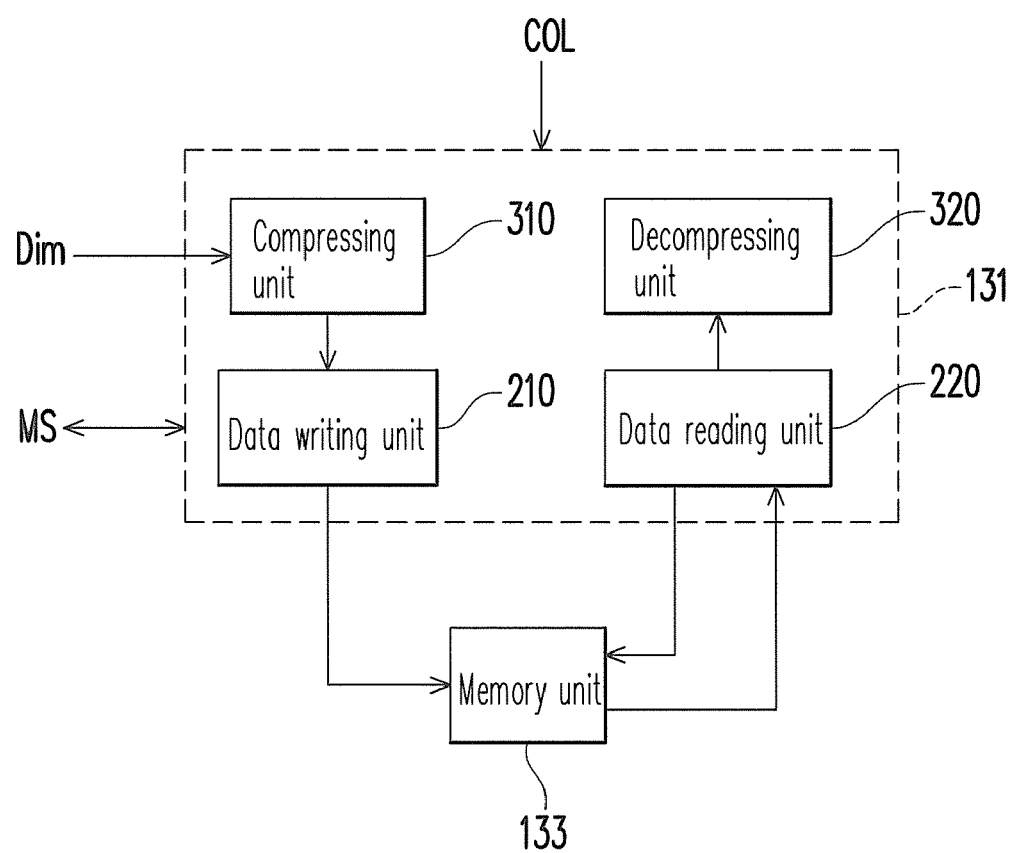
FIG. 3 is a system schematic diagram illustrating a timing controller of FIG. 1 according to another embodiment of the invention.

FIG. 3 is a system schematic diagram illustrating a timing controller of FIG. 1 according to another embodiment of the invention. Referring to FIG. 1 to FIG. 3, in the present embodiment, the timing controller 131 further includes a compressing unit 310 and a decompressing unit 320. The compressing unit 310 is coupled between the data processing device 110 and the data writing unit 210 for compressing the frame data. The decompressing unit 320 is coupled to the data reading unit 220 for restoring the compressed frame data.

In summary, in the computer system of the invention, when the display device is in the reading mode, it can store a plurality of frame data, so that frames can be displayed according to the stored frame data, and the user can switch the displayed frames through the input device. Now, the data processing device enters the idle mode, so as to reduce the power consumption of the computer system.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A computer system, comprising:
   a data processing device, for producing an image signal and a mode signal;
   an input device, for producing a control signal; and
   a display device, comprising:
      a memory unit;
      a controller, coupled to the memory unit and the data processing device for receiving the image signal, the controller comprises:
         a data writing unit, coupled to the memory unit and the data processing device for receiving the image signal; and
         a data reading unit, coupled to the memory unit;
      a source driver, coupled to the controller, and controlled by the controller to output a plurality of driving voltages;
      a gate driver, coupled to the controller, and controlled by the controller to output a plurality of scan signals; and
      a display panel, coupled to the gate driver and the source driver, for displaying according to the driving voltages and the scan signals,
   wherein when the display device is controlled by the mode signal so as to in a reading mode, the controller is coupled to the input device, and writes a plurality of frame data corresponding to a plurality of frames transmitted by the image signal to the memory unit, and determines a read frame data of the frame data according to the control signal to control the source driver and the gate driver, and the data processing device is switched to an idle mode after the frame data is transmitted, wherein the data writing unit sequentially writes the frame data in different positions of the memory unit, the data reading unit reads the frame data stored in the memory unit according to the control signal, and the data reading unit comprises a counter, the counter is controlled by the control signal, the data reading unit determines the frame data to be read according to a counting result of the counter, and
   when the display device is controlled by the mode signal so as to in a general mode, the controller sequentially stores the frame data in the memory unit, and controls the gate driver and the source driver according to the frame data stored in the memory unit, wherein the data writing unit sequentially writes the frame data in a position of the memory unit, and the data reading unit reads the frame data stored in the position of the memory unit.

2. The computer system as claimed in claim 1, wherein the controller further comprises:
   a compressing unit, coupled between the data writing unit and the data processing device, for compressing the frame data; and
   a decompressing unit, coupled to the data reading unit, for restoring the compressed frame data.

3. The computer system as claimed in claim 1, wherein when the frame data stored in the memory unit are all read, the display device is switched to the general mode, and wakes up the data processing device to restore the data processing device to an operation mode to produce the frame data transmitted by the image signal.

4. The computer system as claimed in claim 1, wherein when an amount of unread data of the frame data stored in the memory unit is equal to a value, the display device wakes up the data processing device to restore the data processing device to an operation mode to produce the frame data transmitted by the image signal, and the display device is switched to the general mode when all of the frame data stored in the memory unit is read.

5. The computer system as claimed in claim 1, wherein the display device is controlled by the data processing device and is switched to the reading mode.

6. The computer system as claimed in claim 5, wherein in the general mode, the input device is coupled to the data processing device.

7. The computer system as claimed in claim 6, wherein the data processing device switches the display device to the reading mode according to the control signal.

8. The computer system as claimed in claim 5, wherein the data processing device switches the display device to the reading mode when a read file is static data.

9. The computer system as claimed in claim 1, wherein the display panel is a liquid crystal display panel.

* * * * *